US012152425B2

(12) United States Patent
Schwarzmann et al.

(10) Patent No.: US 12,152,425 B2
(45) **Date of Patent: *Nov. 26, 2024**

(54) GUIDE ASSEMBLY FOR GUIDING AT LEAST ONE MOVABLE FURNITURE PART

(71) Applicant: Julius Blum GmbH, Hoechst (AT)

(72) Inventors: Guenter Schwarzmann, Dornbirn (AT); Kai Hollenstein, Hoechst (AT)

(73) Assignee: JULIUS BLUM GMBH, Hoechst (AT)

( * ) Notice: Subject to any disclaimer, the term of this patent is extended or adjusted under 35 U.S.C. 154(b) by 265 days.

This patent is subject to a terminal disclaimer.

(21) Appl. No.: 17/843,152

(22) Filed: Jun. 17, 2022

(65) Prior Publication Data

US 2022/0316253 A1 Oct. 6, 2022

Related U.S. Application Data

(63) Continuation of application No. PCT/AT2020/060455, filed on Dec. 11, 2020.

(30) Foreign Application Priority Data

Dec. 19, 2019 (AT) .............................. A 51120/2019

(51) Int. Cl.
*E05D 15/58* (2006.01)
*E05C 17/60* (2006.01)

(52) U.S. Cl.
CPC ............. *E05D 15/58* (2013.01); *E05D 13/04* (2013.01); *E05Y 2201/244* (2013.01); (Continued)

(58) Field of Classification Search
CPC ............ E05D 15/0604; E05D 15/0621; E05D 15/165; E05D 15/22; E05D 15/26; (Continued)

(56) References Cited

U.S. PATENT DOCUMENTS 1,970,879 A 8/1934 Bell
4,872,287 A * 10/1989 Block .................... E05D 13/04 16/87 R (Continued)

FOREIGN PATENT DOCUMENTS

AT 521139 11/2019
AT 521260 12/2019

(Continued)

OTHER PUBLICATIONS

Office Action for U.S. Appl. No. 17/840,998 (Year: 2024).*

(Continued)

*Primary Examiner* — Andrew Roersma
(74) *Attorney, Agent, or Firm* — Wenderoth, Lind & Ponack, L.L.P.

(57) ABSTRACT

A guide assembly includes a guide configured to be arranged on a stationary furniture part, a guide device configured to be connected to the movable furniture part, the guide device being displaceable relative to the guide, and an adjustment device for adjusting the guide relative to the stationary furniture part. The adjustment device includes a mounting device configured to be fixed to the stationary furniture part and a coupling device configured to be coupled to the guide. The preferably pivotally supported actuating element is for adjusting the coupling device relative to the mounting device. A securing device is provided for fixing the guide device relative to the guide in a securing position, and the securing device includes a securing body integrated into the adjustment device.

23 Claims, 8 Drawing Sheets

(52) U.S. Cl.
CPC ..... *E05Y 2201/684* (2013.01); *E05Y 2600/12* (2013.01); *E05Y 2600/50* (2013.01); *E05Y 2800/696* (2013.01); *E05Y 2900/212* (2013.01)

(58) Field of Classification Search
CPC ... E05D 15/58; E05D 2015/586; E05D 13/04; E05Y 2201/218; E05Y 2201/22; E05Y 2201/244; E05Y 2600/10; E05Y 2600/12; E05Y 2600/14; E05Y 2600/30; E05Y 2600/31; E05Y 2600/312; E05Y 2800/37; E05Y 2800/696; E05Y 2800/742
See application file for complete search history.

(56) References Cited

U.S. PATENT DOCUMENTS 6,516,575 B2 * 2/2003 Haab ........................ E05D 13/04 52/64
8,677,690 B2 3/2014 Lee et al.
9,127,486 B2 9/2015 Liang et al.
9,894,996 B1 2/2018 Grela et al.
10,145,158 B2 12/2018 Grela et al.
10,323,439 B2 6/2019 Liang et al.
10,563,442 B2 2/2020 Pelekanos
10,750,861 B2 8/2020 Wohlgenannt
10,830,530 B2 11/2020 Alyanak et al.
10,852,055 B2 12/2020 Alyanak et al.
10,920,465 B2 2/2021 Wilke et al.
11,136,804 B2 10/2021 Rupp et al.
11,946,301 B2 * 4/2024 Irgang ................... E05D 15/264
2011/0138589 A1 6/2011 Liang et al.
2012/0047807 A1 3/2012 Lee et al.
2014/0013552 A1 1/2014 Liang et al.
2015/0337563 A1 11/2015 Liang et al.
2017/0247921 A1 8/2017 Pelekanos
2017/0254124 A1 9/2017 Wilke et al.
2018/0112910 A1 4/2018 Alyanak et al.
2018/0125236 A1 5/2018 Grela et al.
2018/0156534 A1 6/2018 Alyanak et al.
2018/0160808 A1 6/2018 Wohlgenannt
2019/0301216 A1 10/2019 Rupp et al.
2020/0018108 A1 1/2020 Sperger et al.
2020/0040632 A1 2/2020 Rupp et al.
2021/0246699 A1 8/2021 Göetz
2021/0246700 A1 8/2021 Hoffmann
2022/0307304 A1 * 9/2022 Irgang ..................... E05D 15/58
2022/0307307 A1 * 9/2022 Rupp .................... E05D 15/264
2022/0316252 A1 * 10/2022 Irgang ..................... E05D 13/04
2022/0364403 A1 * 11/2022 Rupp .................. E05D 15/0652

FOREIGN PATENT DOCUMENTS

CN 102381369 3/2012
CN 107152207 9/2017
DE 933 584 9/1955
DE 28 47 578 5/1980
DE 296 14 902 2/1998
DE 10 2006 053 133 10/2007
EP 0678639 A1 * 10/1995 ......... E05B 65/0823
EP 1 849 940 10/2007
EP 3 037 612 6/2016
JP 2005-336882 12/2005
JP 2011-236598 11/2011
JP 3176072 5/2012
TW 201837292 10/2018
WO 2015/155591 10/2015
WO 2016/046733 3/2016
WO 2016/169897 10/2016
WO 2018/204947 11/2018
WO 2018/204951 11/2018

OTHER PUBLICATIONS

International Search Report issued Mar. 17, 2021 in International (PCT) Application No. PCT/AT2020/060455.
English machine translation of claim 1 of Applicant's own unpublished registration No. AT 50618/2019.

* cited by examiner

GUIDE ASSEMBLY FOR GUIDING AT LEAST ONE MOVABLE FURNITURE PART

BACKGROUND OF THE INVENTION

The present invention relates to a guide assembly for guiding at least one movable furniture part. Furthermore, the invention concerns an item of furniture having such a guide assembly.

Assemblies for guiding a sliding door or a folding-sliding door are already known in the prior art. Austrian application AT 50618/2019 to the present applicant discloses an assembly for guiding a sliding door or a folding-sliding door, with a compensating device for compensating for a tilting moment acting on the sliding door or folding-sliding door.

A drawback of such an assembly is the fact that the mounting operation of the assembly as well as the transport of the assembly prove difficult, because a carrier of the assembly is freely movably supported on a furniture wall via the at least one guide system. In the case of the mounting operation, the carrier has thus always to be held in position by an assembling person. For the transport of the assembly, the carrier or the sliding door or the folding-sliding door, respectively, must be secured against displacement.

SUMMARY OF THE INVENTION

It is an object of the present invention to resolve the drawbacks of the prior art, and to propose an assembly for guiding a sliding door or a folding-sliding door, the assembly being improved with respect to the prior art. A further object is to propose an item of furniture comprising at least one of such an assembly.

As for the guide assembly, at least one securing device is thus provided by which the at least one guide device can be fixed relative to the at least one guide in a securing position, and the at least one securing device includes at least one securing body integrated into the at least one adjustment device.

When the securing device is in a securing position, the at least one guide and the at least one guide device and thus also the stationary furniture part and the movable furniture part are secured relative to one another. In this securing position, the guide assembly can be transported and mounted without any problems. When the guide assembly is located at its destination or when the guide device is completely assembled, the securing device can be transferred into a release position. The at least one guide and the at least one guide device and thus also the stationary furniture part and the movable furniture part are now movable relative to one another.

A securing device according to the invention is insofar advantageous with respect to securing devices according to the prior art (screws, splints, etc.) in that the entire securing device can remain on the guide assembly. Therefore, no screws or splints or the like must be disposed, collected, deposited, etc.

As for an item of furniture according to the invention, it is provided that the item of furniture includes at least one guide assembly according to the invention. Preferably, the item of furniture includes at least one interior space configured to be at least partially covered by the at least one movable furniture part, and kitchen furniture and kitchenware can be arranged within the at least one interior space, and/or the item of furniture includes at least one cavity extending in a depth direction of the item of furniture for at least partially accommodating the at least one movable furniture part.

According to a preferred embodiment of the invention, the at least one securing device includes at least one switch element configured to transfer the at least one securing device from the securing position into a release position. Preferably, the at least one switch element is pivotally supported, and it is particularly preferable that the at least one switch element is configured as a screw.

Such a switch element, in particular in a preferred embodiment, significantly facilitates the transfer of the securing device from the securing position into the release position.

It can further be advantageous when the at least one securing device includes at least one further securing body which is connected or which is configured to be connected to the at least one guide device.

According to a further aspect of the invention, the at least one securing device includes at least one securing element configured to secure the provided securing bodies relative to one another in the securing position and configured to release in a release position, so that the securing bodies are movable relative to one another.

Such a configuration of the securing device provides a simple as well as an efficient securing of the at least one guide device to the at least one guide.

The at least one securing device can include at least one spring element for pre-stressing the at least one securing element in a direction of the securing position.

Preferably, the at least one securing element is configured as a pivoting lever, and/or includes at least one ramp by which the at least one securing element can be overridden by the at least one guide device.

Preferably, the at last one coupling device includes at least one entrainment member, and the at least one guide includes at least one abutment configured to be coupled to the at least one entrainment member, or vice versa.

This provides for a simple implementation of the adjustment device for adjusting the at least one guide relative to the at least one stationary furniture part.

It has proven particularly advantageous when at least one further guide is provided, the at least one further guide being configured to be arranged on the at least one stationary furniture part, and the at least one adjustment device is arranged on the at least one further guide. Preferably, the at least one further guide is configured to be fixed to the at least one stationary furniture part via a fastener.

By virtue of such at least one further guide, a more stable guidance of the movable furniture part on the stationary furniture part can be guaranteed, without the need that additional modifications have to be made on the at least one adjustment device.

It is particularly preferable when at least one transverse guide is provided, the at least one transverse guide extending transversely to the at least one guide. Preferably, the at least one transverse guide is connected or is configured to be connected to the at least one guide in a movement-coupled manner.

In this way, upon an adjustment of the at least one guide relative to the at least one stationary furniture part, the transverse guide is also adjusted therewith. Accordingly, a perfect guidance of the movable furniture part on the stationary furniture part can be ensured, also after an adjusting operation.

It has proven to be advantageous when the guide assembly includes a compensating device for compensating for a tilting moment of a carrier and/or of a furniture part movable on the carrier about a tilting axis.

Thereby, the compensating device can include at least one cable pulling device and/or at least one pivoting lever mechanism, and the at least one pivoting lever mechanism includes at least two pivoting levers hingedly connected to one another.

In this way, an assembly for guiding a folding door or a folding-sliding door with an improved stability and stiffness can be provided.

According to a further aspect of the invention, the compensating device is at least partially, preferably entirely, pre-mounted on the carrier in a delivery condition of the assembly.

This significantly facilitates the mounting operation of the assembly according to the invention. When the at least one securing device is also at least partially, preferably entirely, pre-mounted on the carrier in a delivery condition of the assembly, the mounting operation can be further facilitated.

In a preferred embodiment, the at least one securing body and the at least one entrainment member can be formed together so as to have a one-piece configuration. This leads to a simple configuration of the securing device according to the invention.

Further, the at least one securing element, in a release position, is configured to be at least partially, preferably entirely, countersunk within the at least one securing body.

As mentioned in the introductory part, protection is also sought for an item of furniture comprising at least one guide assembly according to the invention.

BRIEF DESCRIPTION OF THE DRAWINGS

Further details and advantages of the invention will be further explained in the following description with reference to the drawings, in which.

DETAILED DESCRIPTION OF THE INVENTION

Figure 1:
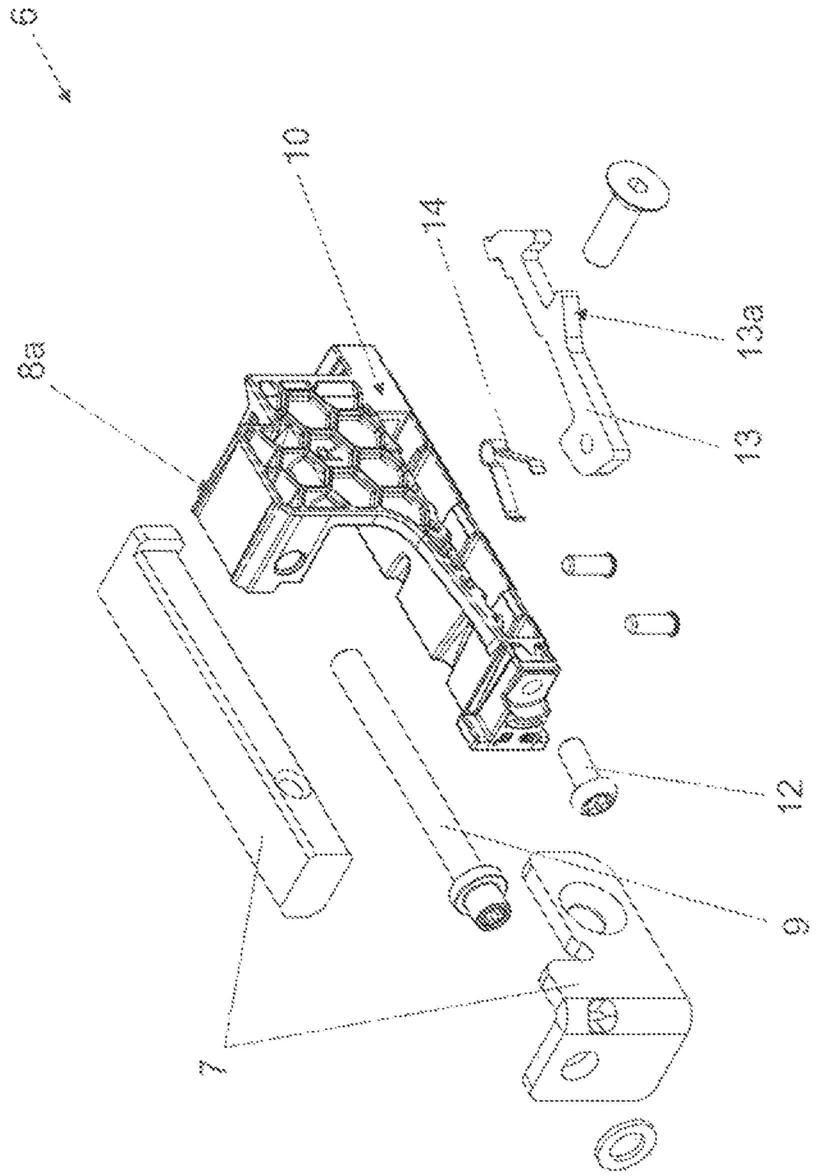
FIG. 1 is an exploded view of an adjustment device according to the invention.

FIG. 1 shows an exploded view of an adjustment device 6 according to the invention. A mounting device 7 for mounting the adjustment device 6 on a stationary furniture part 3 can be seen. An entrainment member 8*a* of a coupling device 8 and a securing body 10 of a securing device 10, 11, 12, 13, 14 are formed together so as to have a one-piece configuration.

In the securing body 10, a spring element 14 and a securing element 13 are arranged, and the securing element 13 is pressurized by a force of the spring element 14. The securing element 13 further includes a ramp 13*a*.

Further, an actuating element 9 for actuating the adjustment device 6 and a switch element 12 for transferring the securing device 10, 11, 12, 13, 14 from a securing position into a release position can be seen.

Figure 2A:
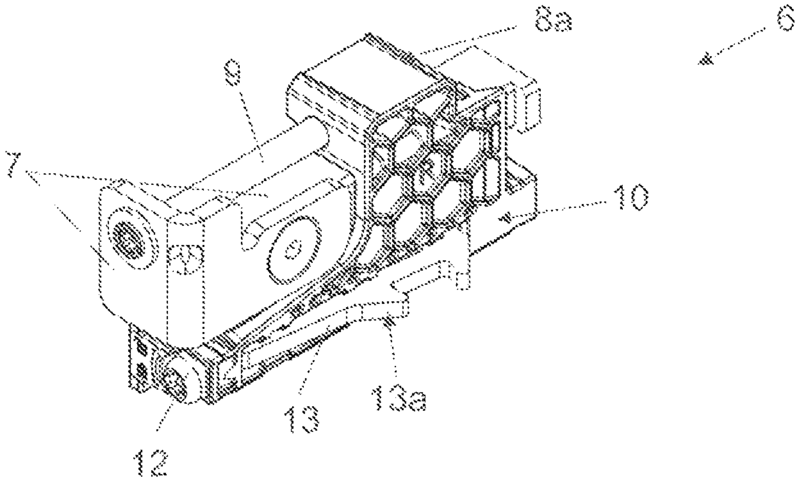
FIG. 2*a* is a perspective view of an adjustment device according to the invention with a portion of the securing device, the portion being in a securing position.
Figure 2B:
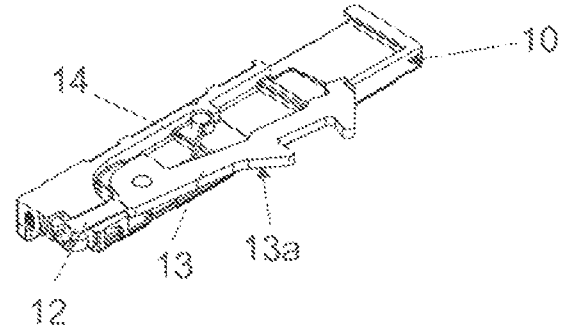
FIG. 2*b* is a perspective view of a cross-section of a part of the securing device, the part being in a securing position.

FIG. 2*a* shows a perspective view of an adjustment device 6 according to the invention with a part of a securing device 10, 11, 12, 13, 14, the part being in a securing position. FIG. 2*b* shows an associated cross-section of the part of the securing device 10, 11, 12, 13, 14.

Figure 3A:
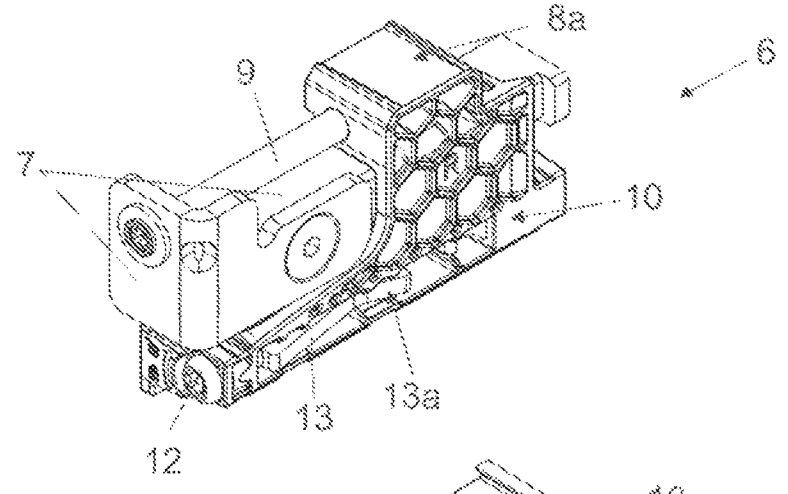
FIG. 3*a* is a perspective view of an adjustment device according to the invention with a part of a securing device, the part being in a release position.
Figure 3B:
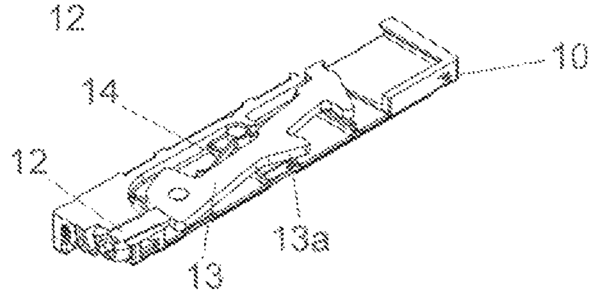
FIG. 3*b* is a perspective view of a cross-section of a part of the securing device, the part being in a release position.

FIG. 3*a*, in turn, shows a perspective view of an adjustment device 6 according to the invention, however, with a part of a securing device 10, 11, 12, 13, 14 being in a release position. FIG. 3*b* shows the associated cross-section of the part of the securing device 10, 11, 12, 13, 14.

From FIGS. 2*a* through 3*b*, it can be seen that a securing element 13, in a securing position, is pressurized with a force of a spring element 14, thereby protruding at least partially over the securing body 10. The recess is thereby in a form-locking connection with a further securing body 11 (not shown).

When now the switch element 12 is actuated, thus the screw turned in, the securing element 13 is movable in a direction of the securing body 10 against the force applied by the spring element 14, and is finally countersunk therein.

It is possible that the securing element 13 is not or is only partially countersinkable within the securing body 10.

The securing element 13 is thus no longer in engagement with the further securing body 11 (not shown). The securing device 10, 11, 12, 13, 14 is located in the release position.

Figure 4A:
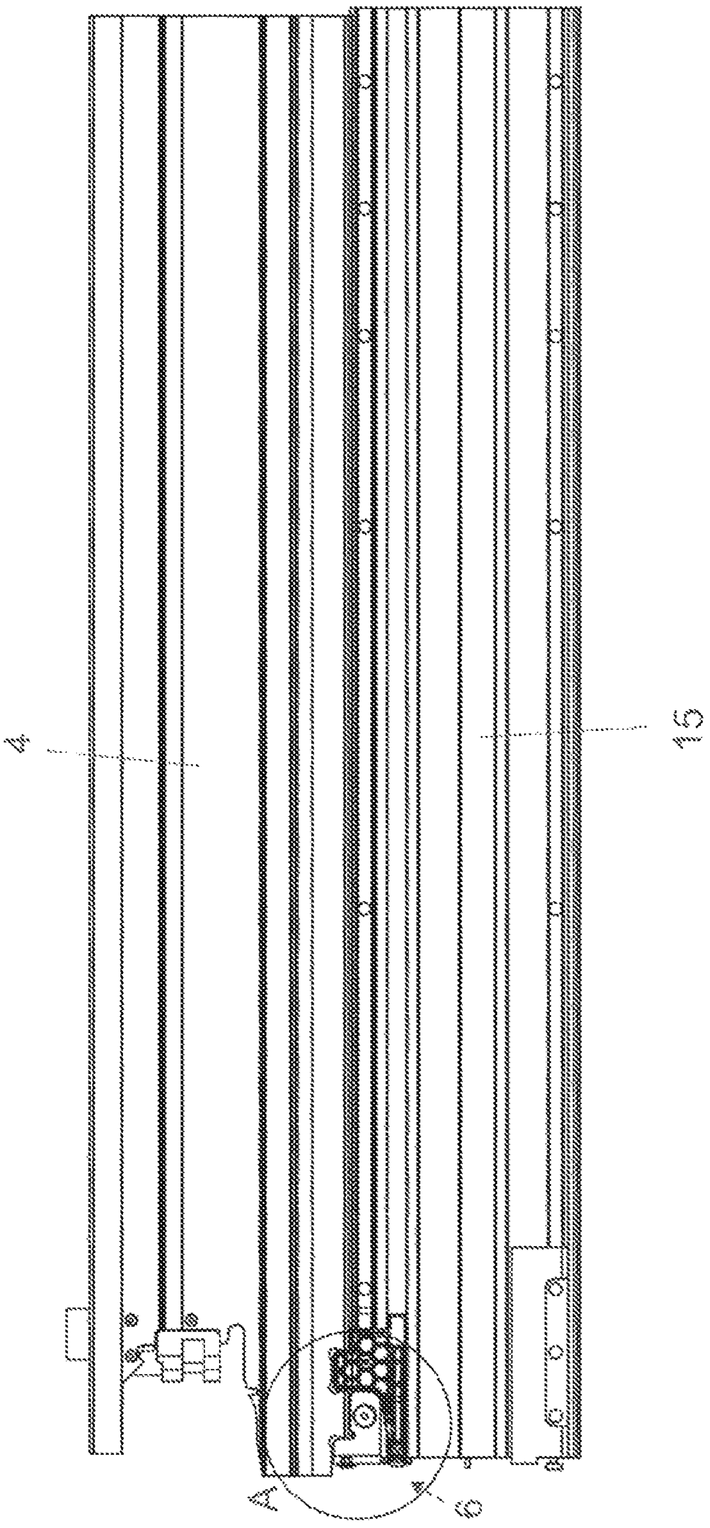
FIG. 4*a* is a side view of an adjustment device according to the invention, of a guide and a further guide.

FIG. 4*a* shows a side view of an adjustment device 6 according to the invention, of a first guide 4 and a second guide 15. It can be seen that the adjustment device 6 is arranged on one end of the first guide 4 and of the second guide 15. However, the adjustment device 6 can basically be arranged on each arbitrary position along the first guide 4 or the second guide 15, respectively.

A fastener for fastening the second guide 15 on the stationary furniture part 3 is not depicted. The fastener can be configured basically in each suitable form, preferably, however, as screws.

Figure 4C:
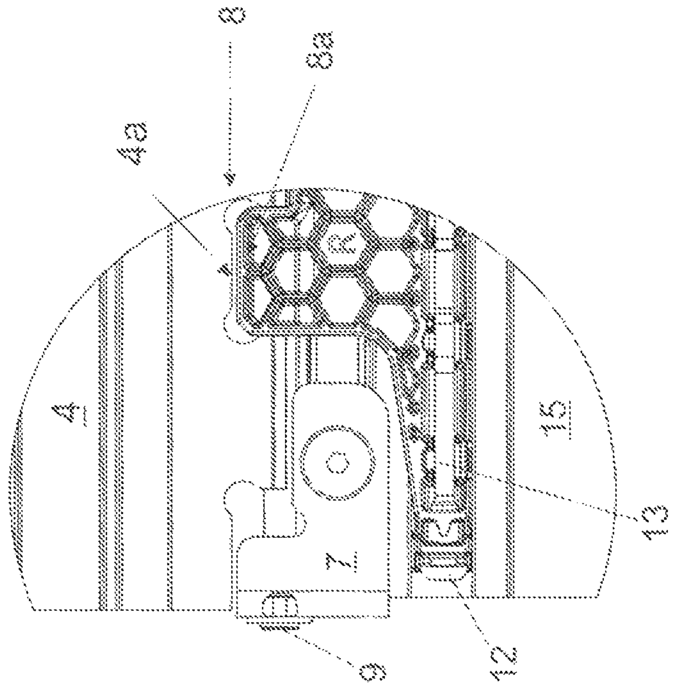
FIG. 4*c* shows the detail A of FIG. 4*a* with an adjustment device after an adjustment operation.
Figure 4B:
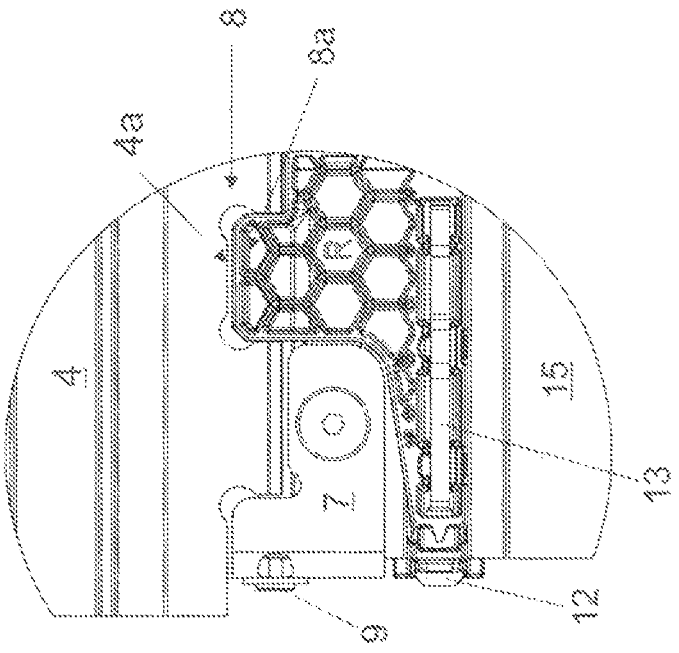
FIG. 4*b* shows the detail A of FIG. 4*a* with an adjustment device before an adjustment operation.

FIG. 4*b* shows the detail A of FIG. 4*a* with an adjustment device 6 before an adjustment operation. FIG. 4*c* shows the detail A with an adjustment device 6 after an adjustment operation.

It can be seen that an entrainment member 8*a* is in a form-locking connection with an abutment 4*a* of the guide 4, the abutment 4*a* being in the form of a recess. The coupling device 8 is formed by the abutment 4*a* and by the entrainment member 8*a*. The mounting device 7 is nondisplaceably arranged on the stationary furniture part 3 and on the second guide 15, respectively.

When the actuating element 9 is actuated, the entrainment member 8*a* and thus the (first) guide 4 are moved away from the mounting device 7. The guide 4 and the furniture part 2 connected to the guide 4 via the at least one guide device 5 are thus displaced relative to the mounting device 7, to the stationary furniture part 3, and to the second guide 15, respectively. In other words, the actuating element 9 allows adjustment of the coupling device 8 (which is coupled to the guide 4) relative to the mounting device 7

Figure 5A:
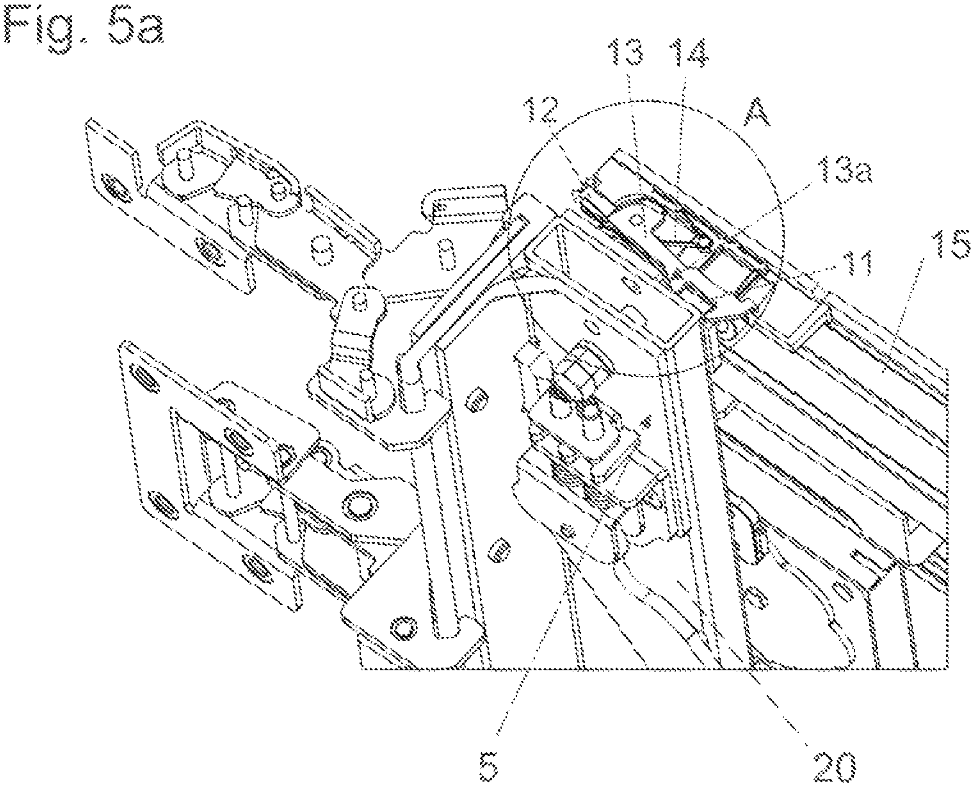
FIG. 5*a* is a cross-sectional view of a guide assembly with a securing device according to the invention in a securing position.

FIG. 5*a* shows a cross-section of a guide assembly 1 with a securing device 10, 11, 12, 13, 14 according to the invention in a securing position. It can be seen that the securing body 11, with which the securing element 13 is engaged, is connected to a guide device 5. The guide device 5 thereby includes a carrier 20.

The securing body 11 arranged on the at least one guide device 5 can thereby ride over the ramp 13*a*, thereby causing the securing element 13 to be countersunk within the securing body 10 against the force applied by the spring element 14. After the ramp 13*a* has been overridden, the securing body 11 comes into engagement with the recess of the securing element 13. The securing device 10, 11, 12, 13, 14 is then located in the securing position.

Figure 5B:
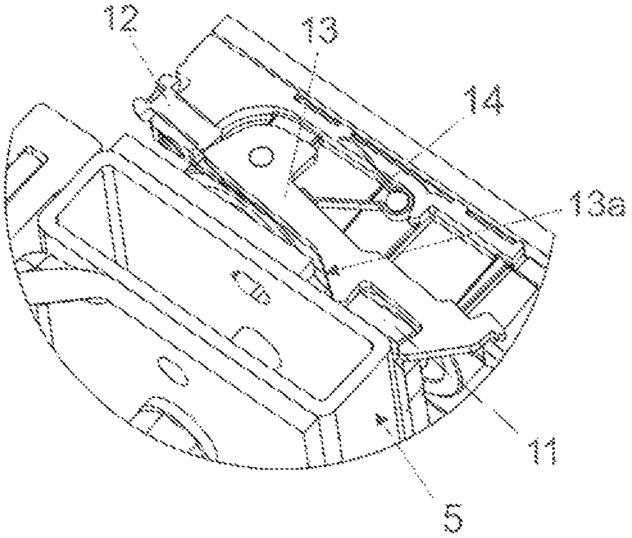
FIG. 5*b* shows the detail A of FIG. 5*a* with a securing device in a securing position.

FIG. 5*b* shows the detail of FIG. 5*a*. It can be again seen that the securing element 13 is engaged with the securing body 11 and is held in the securing position by the spring element 14.

Figure 5C:
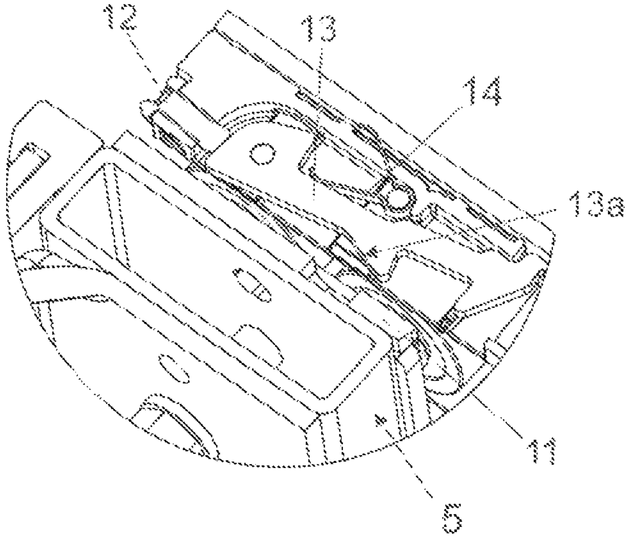
FIG. 5*c* shows the detail A of FIG. 5*a* with a securing device in a release position.

In FIG. 5*c*, the detail A of FIG. 5*a* is shown. However, the securing device 10, 11, 12, 13, 14 is in a release position. The switch element 12 is thus actuated and holds the securing element 13 in the release position, against the force applied by the spring element 14. The securing element 13 is fully countersunk within the securing body 10.

Figure 5D:
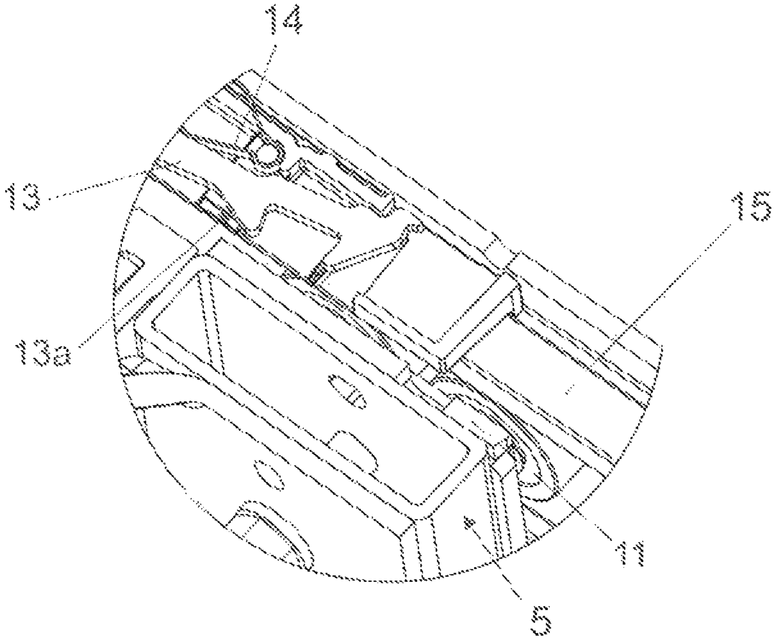
FIG. 5*d* shows the detail A of FIG. 5*a* with a securing device in a release position and with a displaced guide device.

In FIG. 5*d*, the guide device 5 is displaced relative to the securing body 10 and thus relative to the first guide 4, to the second guide 15 and to the stationary furniture part 3. As the securing device 10, 11, 12, 13, 14 is further located in the release position, the guide device 5 can be freely displaced on the first guide 4 and on the second guide 15, respectively.

Figure 6:
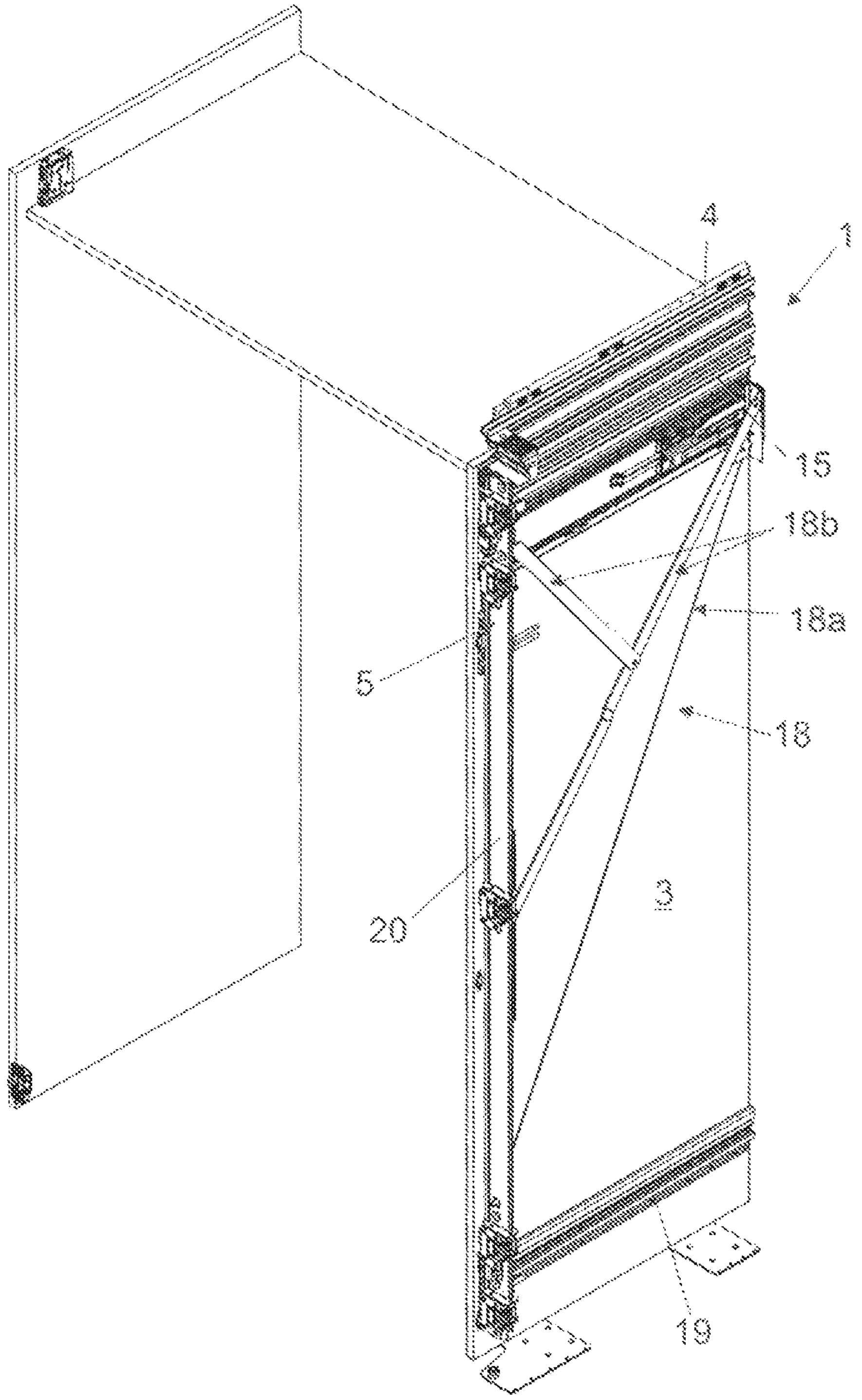
FIG. 6 is a perspective view of a guide assembly according to the invention.

In FIG. 6, a guide assembly 1 according to the invention is shown. The stationary furniture part 3 is thereby in the form of a furniture wall. The movable furniture part 2 is not shown. Further, a compensating device 18 having a cable pulling device 18*a* and a pivoting lever mechanism 18*b* can be seen.

Moreover, an additional guide 19 can be seen, the additional guide 19 providing for a more stable guidance of the guide device 5.

Figure 7:
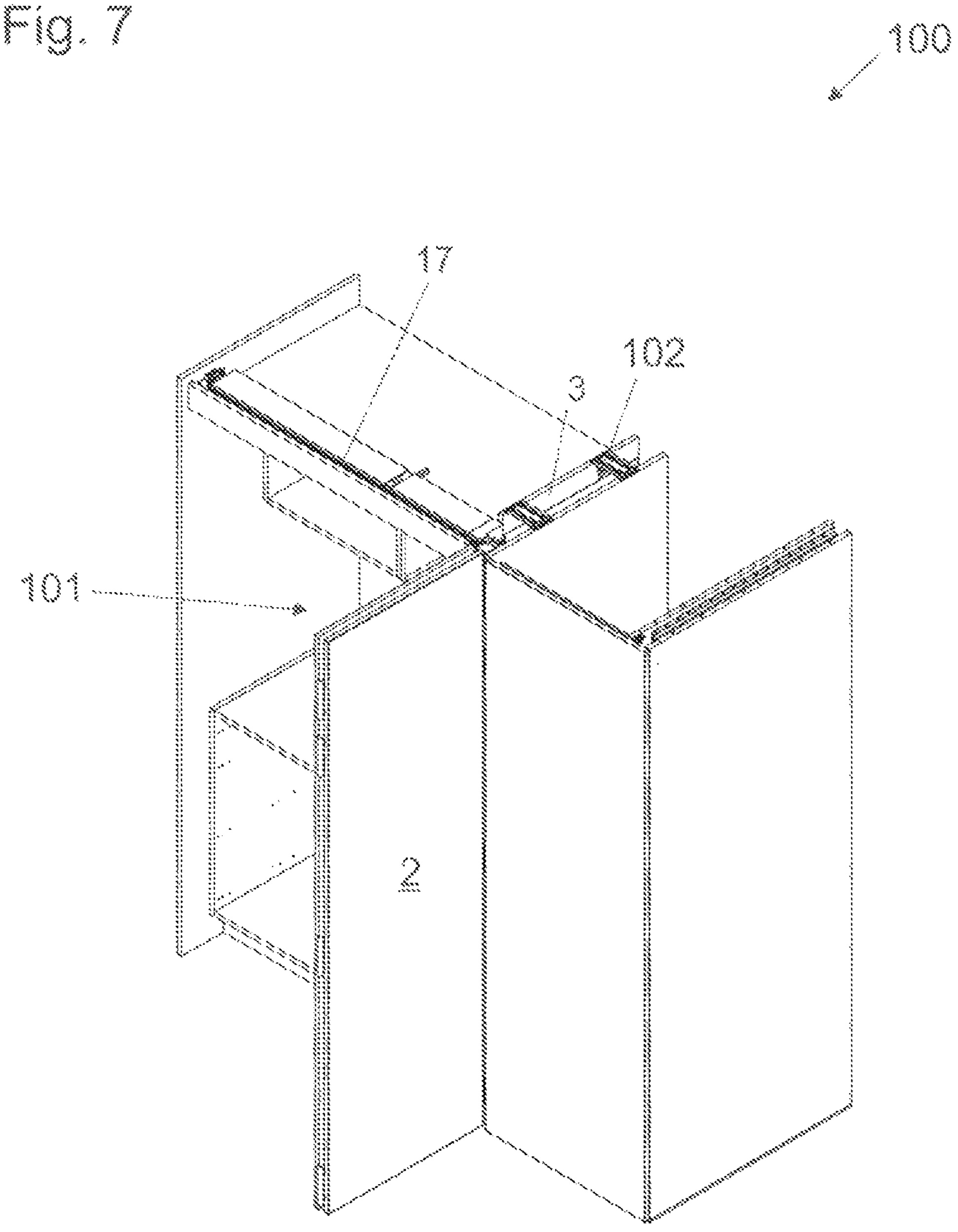
FIG. 7 is a perspective view of an item of furniture according to the invention.

FIG. 7 shows an item of furniture 100 according to the invention with a guide assembly 1. A stationary furniture part 3 and a movable furniture part 2 in the form of a folding-sliding door can be seen. However, the movable furniture part 2 can thereby have basically each suitable form Arranged laterally from the item of furniture 100, a cavity 102 is provided. The cavity 102 is formed by two stationary furniture parts 3 mutually spaced from one another.

In the cavity 102, the movable furniture part 2 in the form of a folding-sliding door can be countersunk in a folded-together condition. When the furniture part 2 in the form of a folding-sliding door is spread apart, the furniture part 2 covers an interior space 101 of the item of furniture 100.

A further part of the item of furniture 100 adjoins the cavity 102, for example a cupboard. When the movable furniture part 2 in the form of a folding-sliding door is in a spreaded-apart position and when the further part of the item of furniture 100 is closed, then the movable furniture part 2 in the form of the folding-sliding door and the further part of the item of furniture 100 form a uniform furniture front.

LIST OF REFERENCES

- 1 guide assembly
- 2 movable furniture part
- 3 stationary furniture part
- 4 guide
- 4*a* abutment
- 5 guide device
- 6 adjustment device
- 7 mounting device
- 8 coupling device
- 8*a* entrainment member
- 9 actuating element
- 10 securing body
- 11 securing body
- 12 switch element
- 13 securing element
- 13*a* ramp
- 14 spring element
- 15 further guide
- 17 transverse guide
- 18 compensating device
- 18*a* cable pulling device
- 18*b* pivoting lever mechanism
- 19 additional guide
- 20 carrier
- 100 item of furniture
- 101 interior space
- 102 cavity

The invention claimed is:

1. A guide assembly for guiding a movable furniture part relative to a stationary furniture part, the guide assembly comprising:

a guide configured to be arranged on the stationary furniture part, a guide device configured to be connected to the movable furniture part, the guide device being displaceable relative to the guide, and an adjustment device for adjusting the guide relative to the stationary furniture part, the adjustment device including a mounting device configured to be fixed to the stationary furniture part and a coupling device configured to be coupled to the guide, an actuating element for adjusting the coupling device relative to the mounting device, and a securing device is provided for fixing the guide device relative to the guide in a securing position, the securing device including a securing body integrated into the adjustment device.

2. The guide assembly according to claim 1, wherein the securing device includes a switch element for transferring the securing device from the securing position into a release position.

3. The guide assembly according to claim 1, wherein the securing body of the securing device is a first securing body, the securing device further including a second securing body connected to or configured to be connected to the guide device.

4. The guide assembly according to claim 3, wherein the securing device further includes a securing element for fixing the first securing body and the second securing body relative to one another in the securing position and for releasing in a release position, so that the first securing body and the second securing body are movable relative to one another.

5. The guide assembly according to claim 3, wherein the securing device further includes a spring element for pre-stressing the securing element in a direction of the securing position.

6. The guide assembly according to claim 4, wherein the securing element is a pivoting lever, and/or the securing element includes a ramp configured to allow the securing element to be overridden by the guide device.

7. The guide assembly according to claim 1, wherein the coupling device includes an entrainment member, and the guide includes an abutment configured to be coupled to the entrainment member, or vice versa.

8. The guide assembly according to claim 1, wherein the guide is a first guide, the guide assembly further comprising a second guide, the second guide being configured to be arranged on the stationary furniture part, wherein the adjustment device is arranged on the second guide.

9. The guide assembly according to claim 1, further comprising a transverse guide arranged transversely to the guide.

10. The guide assembly according to claim 1, further comprising a compensating device for compensating for a tilting moment of a carrier and/or of a movable furniture part arranged on the carrier about a tilting axis.

11. The guide assembly according to claim 10, wherein the compensating device includes a cable pulling device and/or a pivoting lever mechanism, wherein the pivoting lever mechanism includes at least two pivoting levers hingedly connected to one another.

12. The guide assembly according to claim 10, wherein the cable pulling device includes a cable, and a first end of the cable is fixed to the carrier.

13. The guide assembly according to claim 10, wherein the compensating device is at least partially pre-mounted on the carrier in a delivery condition of the guide assembly.

14. The guide assembly according to claim 7, wherein the securing body and the entrainment member are formed together so as to have a one-piece configuration.

15. The guide assembly according to claim 4, wherein the securing element is configured to be at least partially countersunk within the securing body in a release position.

16. An item of furniture comprising:

a movable furniture part, a stationary furniture part, and the guide assembly according to claim 1 for guiding the movable furniture part relative to the stationary furniture part, wherein the stationary furniture part has an interior space configured to be at least partially covered by the movable furniture part, and/or the stationary furniture part has a cavity extending in a depth direction of the item of furniture for at least partially receiving the movable furniture part.

17. The guide assembly according to claim 1, wherein the actuating element is pivotally supported to allow adjustment of the coupling device relative to the mounting device.

18. The guide assembly according to claim 2, wherein the switch element is pivotally supported and configured as a screw.

19. The guide assembly according to claim 8, wherein the second guide is to be fixed to the stationary furniture part via a fastener.

20. The guide assembly according to claim 9, wherein the transverse guide and the guide are connected to or are configured to be connected to one another in a movement-coupled manner.

21. The guide assembly according to claim 12, wherein the cable pulling device includes precisely one cable.

22. The guide assembly according to claim 13, wherein the compensating device is entirely pre-mounted on the carrier in the delivery condition of the guide assembly.

23. The guide assembly according to claim 15, wherein the securing element is configured to be entirely countersunk within the securing body in the release position.

* * * * *